(12) United States Patent
Wang et al.

(10) Patent No.: US 10,356,806 B2
(45) Date of Patent: Jul. 16, 2019

(54) DEVICES AND METHODS IN HETEROGENEOUS NETWORK

(71) Applicant: Telefonaktiebolaget L M Ericsson (publ), Stockholm (SE)

(72) Inventors: Yi-Pin Eric Wang, Fremont, CA (US); Patrik Karlsson, Sollentuna (SE); Sairamesh Nammi, Kista (SE); Fredrik Ovesjö, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 14/761,652

(22) PCT Filed: Jan. 7, 2014

(86) PCT No.: PCT/SE2014/050007
§ 371 (c)(1),
(2) Date: Jul. 17, 2015

(87) PCT Pub. No.: WO2014/112928
PCT Pub. Date: Jul. 24, 2014

(65) Prior Publication Data
US 2015/0365966 A1 Dec. 17, 2015

Related U.S. Application Data

(60) Provisional application No. 61/754,404, filed on Jan. 18, 2013.

(51) Int. Cl.
*H04W 72/12* (2009.01)
*H04L 5/00* (2006.01)
*H04L 25/02* (2006.01)

(52) U.S. Cl.
CPC ....... *H04W 72/1273* (2013.01); *H04L 5/0048* (2013.01); *H04L 25/0226* (2013.01); *H04L 5/0035* (2013.01); *H04L 5/0094* (2013.01)

(58) Field of Classification Search
CPC ............. H04W 24/10; H04W 72/1284; H04W 36/0088
(Continued)

(56) References Cited

U.S. PATENT DOCUMENTS

2005/0002444 A1* 1/2005 Wei .................. H04B 1/707
375/147
2006/0007895 A1* 1/2006 Coralli ................ H04B 1/7107
370/335

FOREIGN PATENT DOCUMENTS

EP  1968223 A1  9/2008
EP  2346188 A2  7/2011

OTHER PUBLICATIONS

Ericsson (Overview of Combined Cell Deployment in Heterogeneous Networks, Feb. 1, 2013).*
(Continued)

*Primary Examiner* — Faruk Hamza
*Assistant Examiner* — Jean F Voltaire
(74) *Attorney, Agent, or Firm* — Sage Patent Group

(57) ABSTRACT

A method, in a network node, for transmitting data in a heterogeneous network cellular communication system comprises transmitting of a SFN pilot signal (262). A SFN pilot signal is a pilot signal transmitted by all radio units of a heterogeneous network cell. Optionally, configuration information about non-SFN pilot signals in a cell of the network node is transmitted (260). Non-SFN pilot signals are pilot signals transmitted by less than all radio units of a heterogeneous network cell. The non-SFN pilot signal is transmitted (264). A control channel signal is transmitted (270) on a control channel and a data channel signal associated with the transmitted control channel signal is transmitted (280) on a data channel. A network node operable therefore is also presented. A method for receiving data in a (Continued)

heterogeneous network cellular communication system and a wireless device operable therefore are also presented.

21 Claims, 11 Drawing Sheets

(58) Field of Classification Search
USPC .......................................................... 370/329
See application file for complete search history.

(56) References Cited

OTHER PUBLICATIONS

Link Level Analysis of Single Frequency Network mode for Combined Cell Deployments.*
Heteregenous Networks Deployment Scenarios.*
Ericsson (Combined Cell Deployment Scenarios in Heterogeneous Networks, dated Nov. 16, 2012).*
Ericsson (Overview of Combined Cell Deployment in Heterogeneous Networks, Feb. 1, 2013) (Year: 2013).*
Unknown, "Combined Cell Deployment Scenarios in Heterogeneous Networks", Ericsson, 3GPP TSG RAN WG1 Meeting #71, R1-125220, New Orleans, USA, Nov. 12-16, 2012, 1-5.
Unknown, "Heterogeneous Network Deployment Scenarios", Ericsson, 3GPP TSG-RAN WG1 #70bis, R1-124513, San Diego, CA, Oct. 8-12, 2012, 1-3.
Unknown, "Link Level Analysis of Single Frequency Network mode for Combined Cell Deployments", Ericsson, 3GPP TSG RAN WG1 Meeting #72, R1-130611, St Julian's, Malta, Jan. 28-Feb. 1, 2013, 1-8.
Unknown, "Overview of Combined Cell Deployment in Heterogeneous Networks", Ericsson, 3GPP TSG RAN WG1 Meeting #72, R1-130610, St Julian's, Malta, Jan. 28-Feb. 1, 2013, 1-12.
Unknown, "TP on Downlink Transmission Modes for Combined Cell Deployment", Ericsson, 3GPP TSG RAN WG1 Meeting #72, R1-130624, St Julian's, Malta, Jan. 28-Feb. 1, 2013, 1-2.
Unknown, Author, "1.28Mcps TDD MBMS Physical Layer Improvements; Overview and Impact to RAN1 Specifications", 3GPP TSG RAN WG1#48bis, Tdoc R1-071440, RITT, CMCC, TD Tech, CATT, ZTE, Spreadtrum Communications, St. Julian, Malta, Mar. 26-30, 2007, pp. 1-6.
Unknown, Author, "Multiplexing DL Multicast and Unicast Transmissions", 3GPP TSG-RAN WG1 #44, R1-060463, Qualcomm Europe, Denver, USA, Feb. 13-17, 2018, pp. 1-3.

* cited by examiner

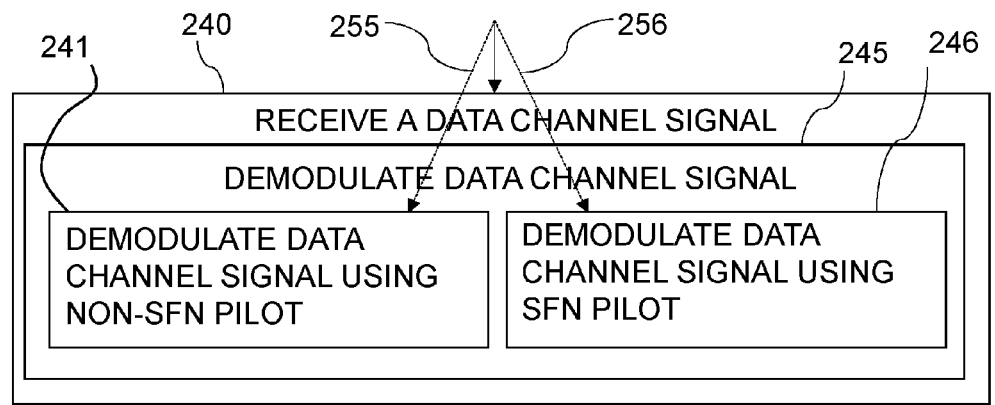
FIG. 13 Part B
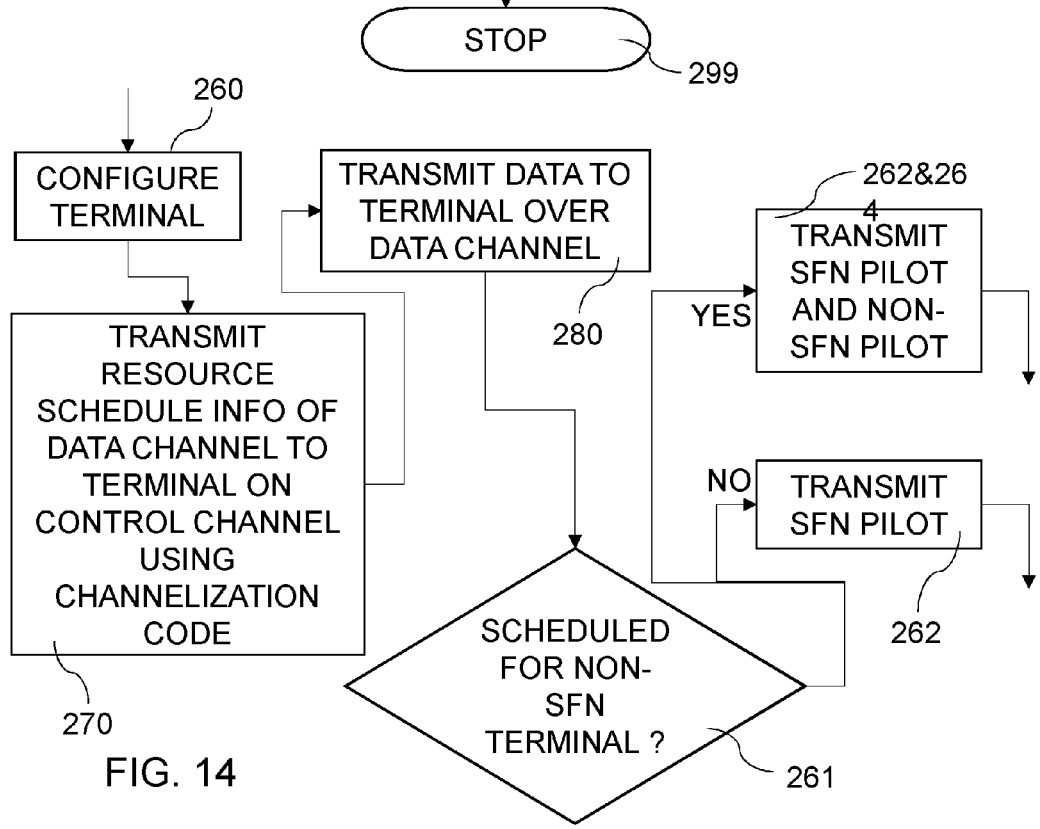
FIG. 14

DEVICES AND METHODS IN HETEROGENEOUS NETWORK

TECHNICAL FIELD

The subject matter described herein generally relates to wireless communication networks. In particular, the subject matter relates to methods, apparatuses, and/or systems for providing downlink signaling in a resource efficient manner.

BACKGROUND

Mobile data traffic is projected to grow at a phenomenal rate in the years to come. To cope with such growth, cellular network operators and equipment vendors are exploring various technologies to significantly improve network capacity. Utilization of more radio spectrum, heterogeneous network (HetNet) deployment, cell site densification, and coordinated multiple-point (CoMP) transmission and reception are among the ones that are currently being explored.

Regarding HetNet, there is currently an ongoing 3GPP study item for investigating potential opportunities to further enhance the performance of HetNet deployment in a Universal Mobile Telecommunications System (UMTS) network. In a HetNet, in addition to the placements of macro base stations, several micro/pico/femto/relay base stations and remote radio units (RRUs) are deployed within the macro cell coverage area.

The power transmitted by these micro/pico/femto/relay base stations and RRUs is relatively small compared to that of the macro base stations. These low power nodes (LPNs) are typically deployed to eliminate coverage holes in the homogeneous network (using macro base stations only). The LPNs can improve capacity in hot-spots. Due to their low transmit power and small physical size, the LPNs can offer flexible site acquisitions. In this document, the term low power node will be used generally to refer to a micro/pico/femto/relay base station (BS), or a RRU.

HetNets can be divided into two deployment categories— co-channel deployment and combined cell (or soft cell or shared cell) deployment. In the co-channel deployment, LPNs are deployed within a macro cell coverage area, where the transmission/reception points created by the LPNs have different cell IDs from that of the macro cell. This will also be referred to as separate-cell scenario. In the combined cell deployment, the transmission/reception points created by the LPNs share the same cell ID as that of the macro cell.

Challenges associated with the co-channel deployment motivate movement to the combined-cell deployment, in which a LPN functions as a cell portion rather than an individual cell.

The baseline implementation of combined-cell that works with any legacy User Equipment (UE) is single frequency network (SFN) operation. With SFN, all nodes within a combined cell transmit the same waveform. This means that an orthogonal variable spreading factor (OVSF) code can only be used to serve one UE in the same transmission time interval (TTI).

At a high network load, the downlink performance of a combined cell deployment based on SFN operation is inferior to that achieved by an equivalent separate-cell deployment with the same LPN locations and power levels. This is due to lack of spatial reuse within the combined cell.

In High Speed Packet Access (HSPA) operation, High Speed Shared Control Channel (HS-SCCH), which is a downlink control channel, is used to signal which UE is scheduled and also what transport format (precoder, code allocation, modulation, and coding rate) will be used on the associated data channel; High Speed Physical Downlink Shared Channel (HS-PDSCH). HS-PDSCH is the physical layer channel of High Speed Downlink Shared Channel (HS-DSCH). In this description, HS-PDSCH and HS-DSCH will be used interchangeably.

According to the 3GPP specifications, a reference channel (for the purpose of channel estimation) used for receiving the HS-SCCH is the Primary Common Pilot Channel (P-CPICH). Since the P-CPICH is transmitted using SFN in a combined cell, HS-SCCH needs to be transmitted using the SFN, to be consistent with its channel reference. The same HS-SCCH signal is transmitted in all cell portions.

To enable spatial reuse, multiple HS-SCCHs need to be transmitted in each cell portion. Thus, when there are many cell portions in a combined cell and spatial reuse is applied to many of these cell portions, HS-SCCH may consume a significant portion of the OVSF code tree.

SUMMARY

To address these and other problems, one or more methods, apparatuses and/or systems are described herein in which downlink scheduling signals are provided in a resource efficient manner.

In general words, in a first aspect, a method for receiving data in a wireless equipment in a heterogeneous network cellular communication system comprises receiving configuration information about non-SFN pilot signals in a cell to which the wireless equipment is connected. Non-SFN pilot signals are pilot signals transmitted by less than all radio units of a heterogeneous network cell. Such a non-SFN pilot signal is received. A control channel signal is received. The received control channel signal is monitored using the received non-SFN pilot signal as reference. The control channel signal is demodulated. A data channel signal associated with the received control channel signal is received and the data channel signal is demodulated.

In a second aspect, a method, in a network node, for transmitting data in a heterogeneous network cellular communication system comprises transmitting of a non-SFN pilot signal. Non-SFN pilot signals are pilot signals transmitted by less than all radio units of a heterogeneous network cell. A SFN pilot signal is transmitted. A SFN pilot signal is a pilot signal transmitted by all radio units of a heterogeneous network cell. A control channel signal is transmitted on a control channel and a data channel signal associated with the transmitted control channel signal is transmitted on a data channel.

In a third aspect, a method for transmitting data in a heterogeneous network cellular communication system, comprises transmitting, from a first network node, configuration information about non-SFN pilot signals in a cell of the first network node; and performing, in a second network node, a method according to the second aspect. The second network node is different from the first network node.

In a fourth aspect, a wireless device comprises a wireless transceiver, a channel estimator, a controller and a demodulator. The wireless transceiver is operative to receive a control channel signal. The wireless transceiver is further operative to receive a data channel signal associated with the received control channel signal. The demodulator is operative to demodulate the control channel signal. The demodulator is further operative to demodulate the data channel signal. The wireless transceiver is further operative to receive configuration information about non-SFN pilot signals in a cell to which the wireless device is connected.

Non-SFN pilot signals are pilot signals transmitted by less than all radio units of a heterogeneous network cell. The wireless transceiver is further operative to receive such a non-SFN pilot signal. The controller is operative to monitor the received control channel signal using the received non-SFN pilot signal as reference.

In a fifth aspect, a network node in a heterogeneous network cell, comprises a pilot generator and a wireless transceiver. The pilot generator is operative to create a SFN pilot signal. The SFN pilot signal is a pilot signal transmitted by all radio units of a heterogeneous network cell. The wireless transceiver is operative to transmit the SFN pilot signal. The pilot generator is operative to create a non-SFN pilot signal and the wireless transceiver is operative to transmit the non-SFN pilot signal. The non-SFN pilot signal is a pilot signal transmitted by less than all radio units of a heterogeneous network cell. The wireless transceiver is operative to transmit a control channel signal on a control channel. The wireless transceiver is operative to transmit a data channel signal associated with the transmitted control channel signal on a data channel.

In a sixth aspect, a heterogeneous network cellular communication system, comprises a first network node and a second network node in a cell. The second network node is different from said first network node. The first network node comprises a configuration manager and a wireless configuration transceiver. The configuration manager is operative to create configuration information about non-SFN pilot signals in the cell. The wireless configuration transceiver is operative to transmit the configuration information. The second network node being a network node according to the fifth aspect.

In a seventh aspect, a wireless device comprises a wireless interface, a processor and a storage comprising instructions executable by the processor. The wireless device is operative to receive configuration information about non-SFN pilot signals in a cell to which the wireless equipment is connected. The non-SFN pilot signals are pilot signals transmitted by less than all radio units of a heterogeneous network cell. The wireless device is further operative to receive such a non-SFN pilot signal. The wireless device is further operative to receive a control channel signal and to demodulate the control channel signal. The wireless device is further operative to monitor the received control channel signal using the received non-SFN pilot signal as reference. The wireless device is further operative to receive a data channel signal associated with the received control channel signal and to demodulate the data channel signal.

In an eighth aspect, a network node in a heterogeneous network cell comprises a wireless interface, a network interface, a processor and a storage comprising instructions executable by the processor. The network node is operative to transmit a SFN pilot signal. The SFN pilot signal is a pilot signal transmitted by all radio units of a heterogeneous network cell. The network node is further operative to transmit a non-SFN pilot signal. The non-SFN pilot signal is a pilot signal transmitted by less than all radio units of a heterogeneous network cell. The network node is further operative to transmit a control channel signal on a control channel and to transmit a data channel signal associated with the transmitted control channel signal on a data channel.

In a ninth aspect, a wireless device comprises a first receiving module for receiving a control channel signal, a first demodulating module for demodulating the data channel signal, a second receiving module for receiving a data channel signal associated with the received control channel signal and a second demodulating module for demodulating the data channel signal. The wireless device further comprises a third receiving module for receiving configuration information about non-SFN pilot signals in a cell to which the wireless equipment is connected. The non-SFN pilot signals are pilot signals transmitted by less than all radio units of a heterogeneous network cell. The wireless device further comprises a fourth receiving module for receiving such a non-SFN pilot signal and a monitoring module for monitoring the received control channel signal using the received non-SFN pilot signal as reference.

In a tenth aspect, a network node in a heterogeneous network cell comprises a first transmitting module for transmitting a SFN pilot signal. The SFN pilot signal is a pilot signal transmitted by all radio units of a heterogeneous network cell. The network node further comprises a second transmitting module for transmitting a control channel signal on a control channel and a third transmitting module for transmitting a data channel signal associated with the received control channel signal on a data channel. The wireless device further comprises a fourth transmitting module for transmitting a non-SFN pilot signal. The non-SFN pilot signals are pilot signals transmitted by less than all radio units of a heterogeneous network cell.

In an eleventh aspect, a computer program, resides in a storage. The computer program comprises program code, which when executed by a processing circuitry causes the processing circuitry to receive configuration information about non-SFN pilot signals in a cell to which a wireless equipment is connected. The non-SFN pilot signals are pilot signals transmitted by less than all radio units of the heterogeneous network cell. The computer program further comprises program code, which when executed by a processing circuitry causes the processing circuitry to receive such a non-SFN pilot signal, to receive a control channel signal, to demodulate the control channel signal, to monitor the received control channel signal using the received non-SFN pilot signal as reference, to receive a data channel signal associated with the received control channel signal and to demodulate the data channel signal.

In a twelfth aspect, a computer program product comprises a computer-readable medium on which a computer program is stored. The computer program comprises program code, which when executed by a processing circuitry causes the processing circuitry to receive configuration information about non-SFN pilot signals in a cell to which a wireless equipment is connected. The non-SFN pilot signals are pilot signals transmitted by less than all radio units of a heterogeneous network cell. The computer program further comprises program code, which when executed by a processing circuitry causes the processing circuitry to receive such a non-SFN pilot signal, to receive a control channel signal, to demodulate the control channel signal, to monitor the received control channel signal using the received non-SFN pilot signal as reference, to receive a data channel signal associated with the received control channel signal and to demodulate the data channel signal.

In a thirteenth aspect, a computer program resides in a storage. The computer program comprises program code, which when executed by a processing circuitry causes the processing circuitry to transmit a SFN pilot signal. A SFN pilot signal is a pilot signal transmitted by all radio units of a heterogeneous network cell. The computer program further comprises program code, which when executed by a processing circuitry causes the processing circuitry to transmit a control channel signal on a control channel, to transmit a data channel signal associated with the transmitted control channel signal on a data channel, and to transmit a non-SFN pilot signal. Non-SFN pilot signal is a pilot signal transmitted by less than all radio units of a heterogeneous network cell.

In a fourteenth aspect, a computer program product comprises a computer-readable medium on which a computer program is stored. The computer program comprises program code, which when executed by a processing circuitry causes the processing circuitry to transmit a SFN pilot signal. The SFN pilot signal is a pilot signal transmitted by all radio units of a heterogeneous network cell. The computer program further comprises program code, which when executed by a processing circuitry causes the processing circuitry to transmit a control channel signal on a control channel, to transmit a data channel signal associated with the transmitted control channel signal on a data channel and to transmit a non-SFN pilot signal. Non-SFN pilot signal is a pilot signal transmitted by less than all radio units of a heterogeneous network cell.

One advantage with the proposed technology is that downlink signaling can be performed in a more efficient way. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 14 illustrates an example flow chart of a method performed by a LPN to transmit resource scheduling information in a combined cell;

DETAILED DESCRIPTION

Throughout the drawings, the same reference numbers are used for similar or corresponding elements.

For a better understanding of the proposed technology, it may be useful to begin with a brief overview of principles of the heterogeneous network.

Figure 1:
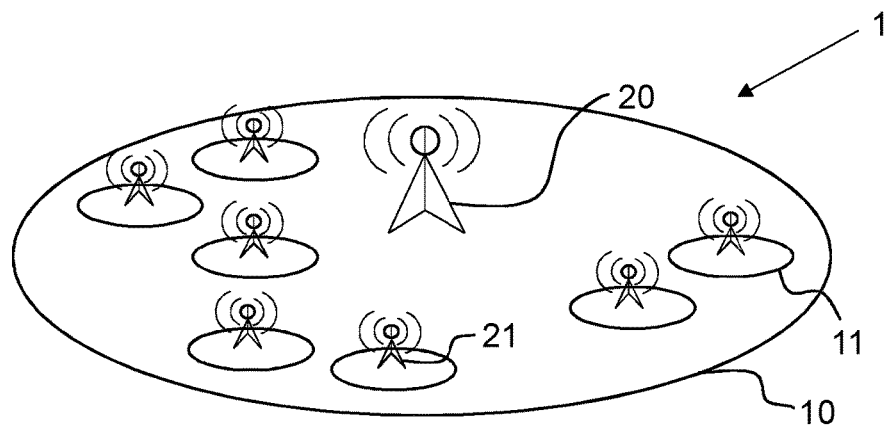
FIG. 1 illustrates a typical deployment of low power nodes in a heterogeneous network.

FIG. 1 illustrates a typical deployment of low power nodes in a heterogeneous network 1. A macro base station 20 is associated with a cell 10. Within the coverage area of the cell 10, a number of low power nodes 21 are present, which each cover a small cell 11 overlapping the cell 10. As mentioned in the background, these LPNs are typically deployed to eliminate coverage holes in the homogeneous network or to improve capacity in traffic hot spots.

HetNets can be divided into two deployment categories—co-channel deployment and combined cell (or soft cell or shared cell) deployment. Through a co-channel deployment using LPN as separate cells, network capacity can be improved. However, it also poses a number of challenges.

Co-channel deployment causes frequent handovers and dropped calls. The reason is that there are more cells in a macro node coverage area with the introduction of LPNs, and hence the frequency of handovers is increased. This results in more frequent RRC signaling which may negatively impact the end user performance. For example, more dropped calls may result due to RRC signaling delay or failure.

Scrambling code allocation is also a problem. In a co-channel deployment, each LPN has a different primary scrambling code, and thus, allocation of primary scrambling codes may pose problems. This is because there is a risk that multiple neighbor cells might use the same scrambling codes. Without coordination between these cells, the UE experiences significant interferences from these cells, and it becomes a challenge to identify which cell that should be included in the active set.

The neighbor cell list size is also affected. In a co-channel deployment, the neighbor cell list becomes too large to cover all radio positions. The cell planning and the system capability to identify and keep the cell update subset is complex.

Co-channel deployment also causes inter-cell interference and pilot pollution. With the introduction of LPNs, the interference structure becomes more complex than in a homogenous network. Since all LPNs must transmit the pilot signals continuously, irrespective of data transmission, the pilot pollution is more severe.

There is also a downlink/uplink imbalance. The well-known problem of downlink/uplink imbalance where the UE is served by strong macro downlink and has a stronger uplink to the LPN. This might cause problems, both for uplink and downlink control channels.

Finally, energy consumption is unnecessary high. In a co-channel deployment, the pilots and certain control channels are always transmitted, even if no UE is served by these LPNs. Therefore, the energy associated with these channels is wasted.

Figure 2:
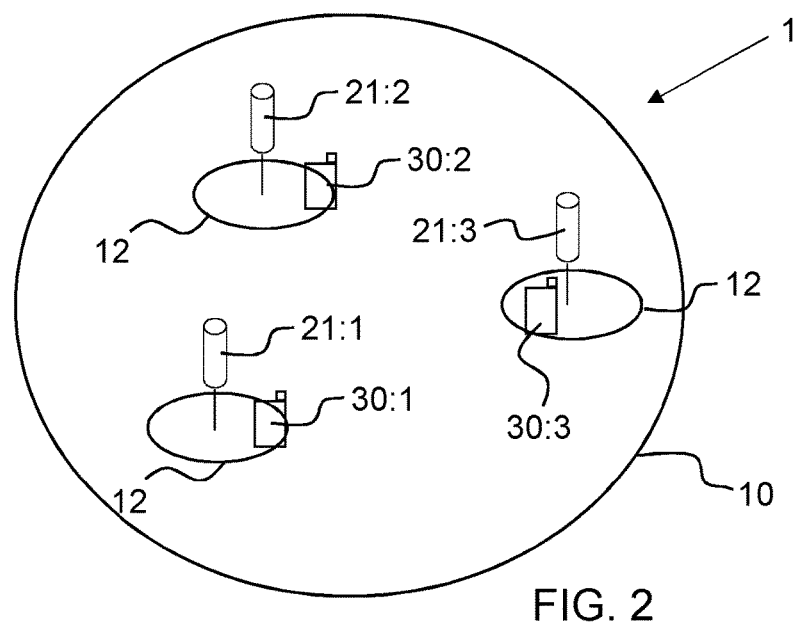
FIG. 2 illustrates an example of a combined cell with three RRUs deployed each serving a cell portion.

The other alternative, a combined-cell example, is illustrated in FIG. 2. As shown, the example combined cell 10 includes three RRUs 21:1, 21:2, 21:3, each serving a cell portion 12. Three UEs 30:1, 30:2 and 30:3 are situated in one respective such cell portion 12. Prior art combined-cell HetNets use SFN operation, which leads to that an OVSF code can only be used to serve one UE in the same TTI, as is illustrated in FIG. 3.

Figure 3:
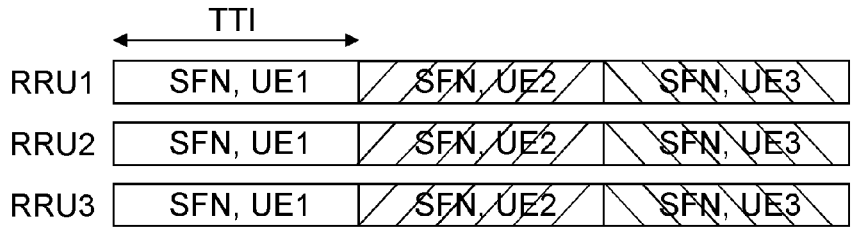
FIG. 3 illustrates a SFN operation for three RRU's.

As seen in FIG. 3, in the first TTI, all the RRUs transmit the same signal intended for UE1 on a particular OVSF code. This particular OVSF code cannot be used to serve another UE in the same combined cell. The LPNs, e.g. RRUs, may serve another UE in the next TTI using SFN. Again, any OVSF code used by the SFN operation cannot be used to serve another UE in the same combined cell during the same TTI.

Figure 4:
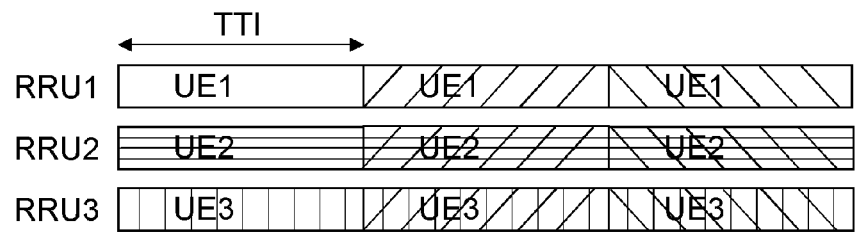
FIG. 4 illustrates spatial reuse where different users can be served in different cell portions during the same TTI.

For completeness, it should be mentioned that spatial-reuse within a combined cell can be made possible based on the operation principle of MIMO, which leverages spatial isolation and transmits different information symbols on the same radio resource, i.e. the same scrambling code, the same OVSF code, and the same symbol interval. This is illustrated in FIG. 4. Here, an example spatial reuse within a combined cell is illustrated, where different users can be served in different cell portions during the same TTI. However, this requires a MIMO setup.

Figure 5:
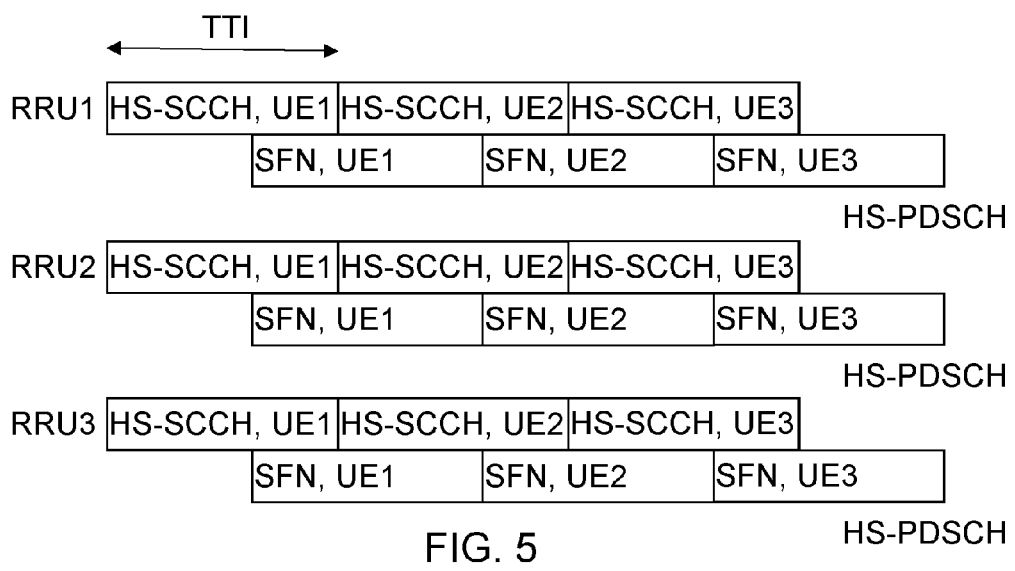
FIG. 5 illustrates example HS-SCCH signals scheduling and transport format indication for associated HS-DSCH.

In the description below HSPA is used as an implementation example. As illustrated in FIG. 5, HS-SCCH is transmitted two slots ahead of the associated HS-DSCH. Thus, there is one overlapped slot between HS-SCCH and the associated HS-PDSCH during the same TTI, since there are three slots in each TTI. In FIG. 5, depicting a prior art situation, since only one UE is scheduled in a TTI, only one HS-SCCH is needed. The reference channel used for receiving the HS-SCCH is P-CPICH and since the P-CPICH is transmitted using SFN in a combined cell, HS-SCCH needs to be transmitted using the SFN, to be consistent with its channel reference. Thus, as seen in FIG. 5, the same HS-SCCH signal is transmitted in all cell portions.

Figure 6:
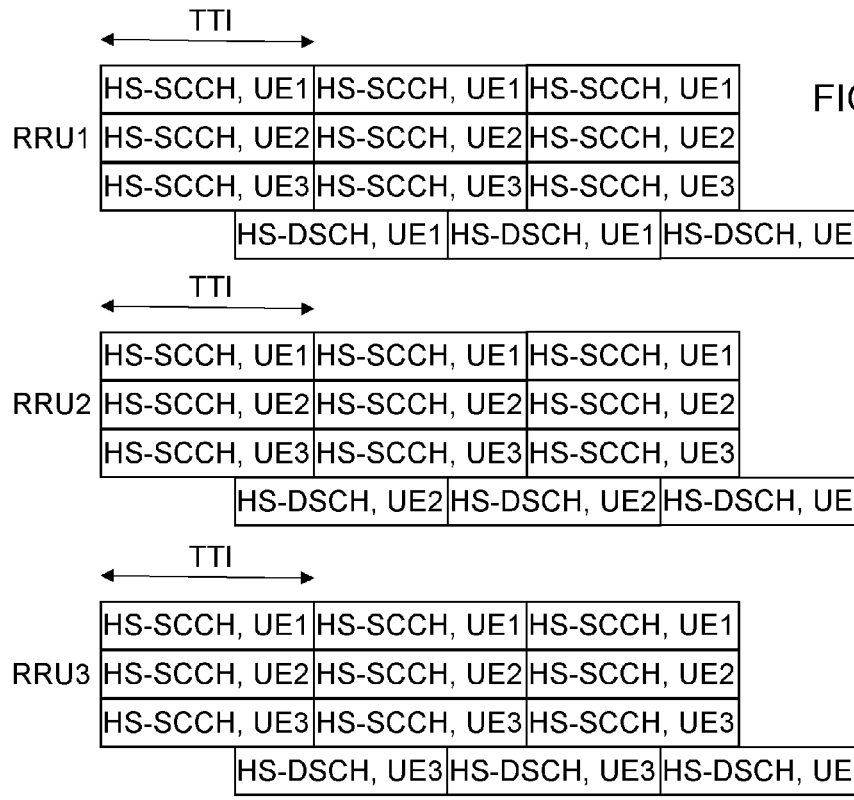
FIG. 6 illustrates example HS-SCCHs to support spatial reuse within a combined cell.

To enable spatial reuse, multiple HS-SCCHs need to be transmitted in each cell portion. This is illustrated in FIG. 6, which shows each HS-SCCH channel consuming one OVSF code of spreading factor (SF) 128.

The disclosed subject matter, at least in part, may be directed to provide downlink scheduling signals in a combined cell deployment. In the following, the term "non-SFN" will be used to indicate that a particular signal is transmitted from a subset, and potentially only one, of all RRUs in the cell. RRUs are examples of LPNs. In other words, non-SFN signals are signals transmitted by less than all radio units of the heterogeneous network cell. In particular, non-SFN pilot signals are pilot signals transmitted by less than all radio units of the heterogeneous network cell. Analogously, SFN signals are signals transmitted by all radio units of the heterogeneous network cell, and in particular, a SFN pilot signal is a pilot signal transmitted by all radio units of the heterogeneous network cell.

Terminologies from 3GPP are used below only to facilitate explanation and example application. Wireless systems such as Wideband Code Division Multiple Access (WCDMA), Worldwide Interoperability for Microwave Access (WiMax), UMB, Global System for Mobile communications (GSM), WiFi, and others may benefit from the technology described herein.

Some or all aspects of the disclosed subject matter may be applicable in a heterogeneous network comprising one or more macro radio nodes and one or more LPNs. Each macro radio node may provide services within a coverage area, a cell, corresponding to that macro radio node. The macro cell may be identifiable, e.g., by a cell id. Each LPN may provide services within a coverage area, a cell portion, corresponding to that low power node.

In the following, embodiments using HSPA will be described. But it should be kept in mind that inventive concepts described are readily applicable to wireless systems in general and not limited to HSPA systems.

In one or more aspects, spatial reuse may be applied to a downlink control channel, e.g. HS-SCCH. In this way, the same channelization code, e.g. the same OVSF code, can be used for different control channel signaling to different wireless terminals, e.g. UEs, in different cell portions. For example, a wireless terminal may be configured to receive a data channel, e.g. HS-DSCH, HS-PDSCH, corresponding to the control channel based on a non-SFN pilot signal. The wireless terminal may use the same non-SFN pilot signal as a reference for receiving the corresponding downlink control channel, e.g. corresponding HS-SCCH. Such control channel will be referred to as non-SFN control channel, e.g., non-SFN HS-SCCH. Note that there can be more than one non-SFN control channel per cell. Also, there can be more than one non-SFN control channel per cell portion, for example, to support multiple wireless terminals scheduled in the same TTI and in the same cell portion.

In other words, a network node can instruct a UE to look for non-SFN pilot signals. If such a non-SFN pilot signal occurs, the UE can use the non-SFN pilot signal for channel estimations which then can be used for demodulating non-SFN control channel signals and non-SFN data channel signals.

A wireless terminal may monitor one or more non-SFN control channels. For each non-SFN control channel, e.g. non-SFN HS-SCCH, a corresponding non-SFN pilot may serve as a reference signal for channel estimation purposes. The wireless terminal may also monitor one or more SFN control channels in which there is a defined SFN pilot signal for each SFN control channel. For example, for the conventional HS-SCCH, P-CPICH serves as the reference signal. Note that however multiple non-SFN control channels may share the same non-SFN pilot. Similarly, multiple SFN control channels may share the same SFN pilot.

Note that the wireless terminal may simultaneously monitor one or more non-SFN control channels and one or more SFN control channels. Also, note that the control channel and the data channel may share the same non-SFN pilot. For example, from the perspective of a UE, i.e. wireless terminal, the same non-SFN pilot can be used to detect both HS-SCCH and HS-DSCH.

The non-SFN pilot signals and the non-SFN control channels may be transmitted by a subset of LPNs of a combined cell.

Figure 7:
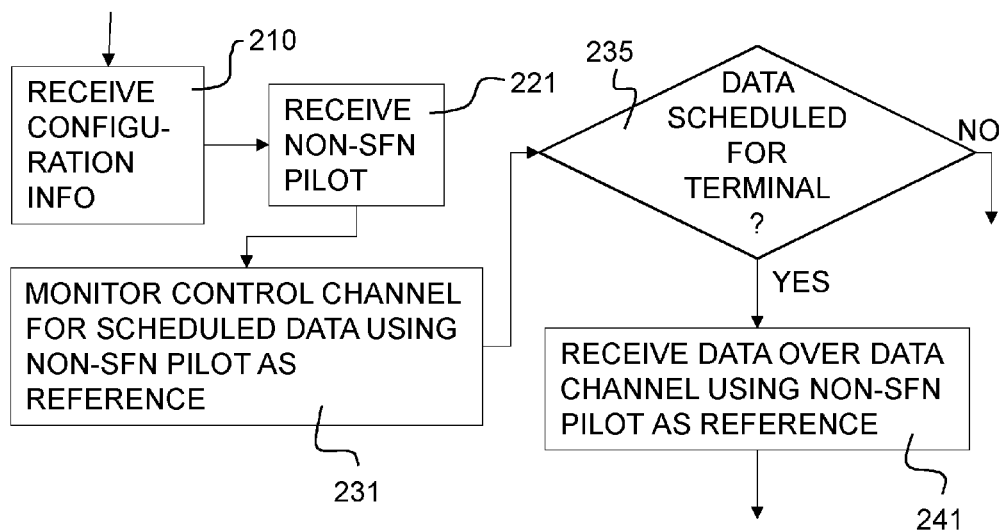
FIG. 7 illustrates an example flow chart of a method performed by a wireless terminal capable of monitoring SFN and non-SFN channels.

FIG. 7 illustrates a flow chart of an example method that may be performed by a wireless terminal capable of monitoring both SFN and non-SFN channels and signals. In this figure, it may be assumed that the wireless terminal is being served by an LPN of a combined cell capable of transmitting SFN and non-SFN signals. In step 210, configuration information is received, concerning non-SFN pilot signals in a cell to which the wireless equipment is connected. In step 221, a non-SFN pilot signal is received. In step 231, a received control channel signal is monitored for scheduled data using the received non-SFN pilot signal as reference. In step 235, it is determined whether or not the data is scheduled for the wireless terminal. If the data is scheduled for the wireless terminal, the process continues to step 241 in which data is received over a data channel using the non-SFN pilot as a reference.

The wireless terminal may receive one or more non-SFN pilot signals from the LPN. Using the non-SFN pilot signal, the terminal may monitor a control channel to receive scheduling information from the LPN. If data is scheduled for the terminal, then at the appropriate data reception time, the terminal may receive the data over a data channel, again using the non-SFN pilot signal as the reference.

Optionally, the wireless terminal may receive the configuration information, from the LPN itself or from the macro node regarding the non-SFN channels and pilot signals. Such configuration information may be received during a call set up.

Figure 8:
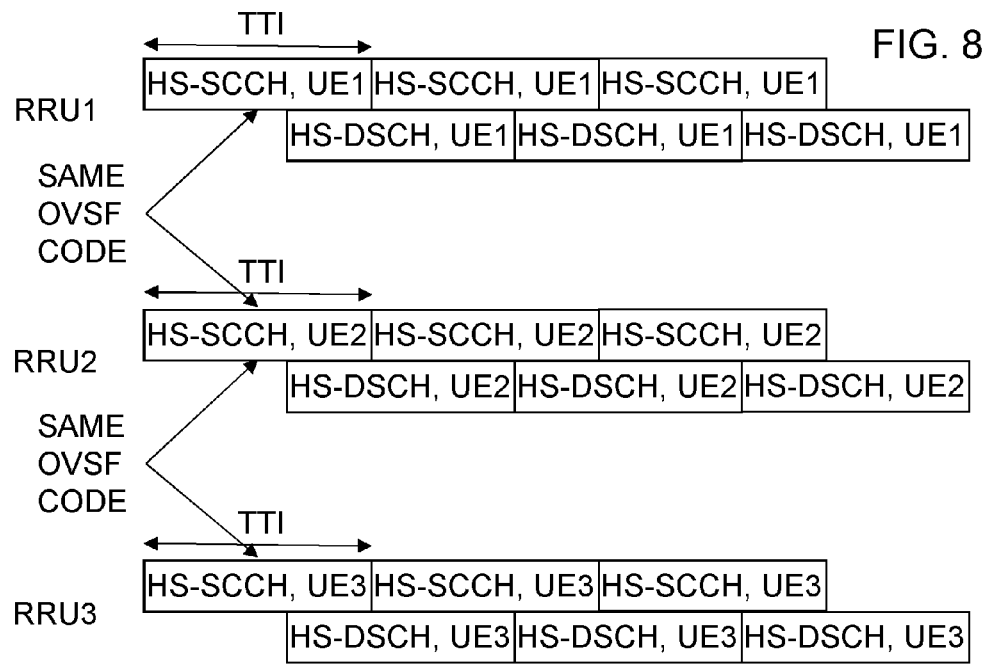
FIG. 8 illustrates an example OVSF code reuse for HS-SCCH signaling in different cell portions.

Reusing the same OVSF code for HS-SCCH signaling to schedule different UEs in different cell portions is illustrated in FIG. 8. To enable the OVSF code reuse, a non-SFN pilot signal may be used to detect the HS-SCCH. In one embodiment, a subset of RRUs within a combined cell may transmit the non-SFN pilot(s) and non-SFN HS-SCCH(s). The non-SFN pilot signal can be cell-portion-specific or even UE-specific.

Here, the subset includes some, but not all, LPNs. If all nodes of the combined cell transmit the same signal, then by definition, that signal becomes a SFN signal. Thus, in this context, a subset of LPNs excludes a circumstance in which all nodes of the combined cell are included in the subset.

Figure 9:
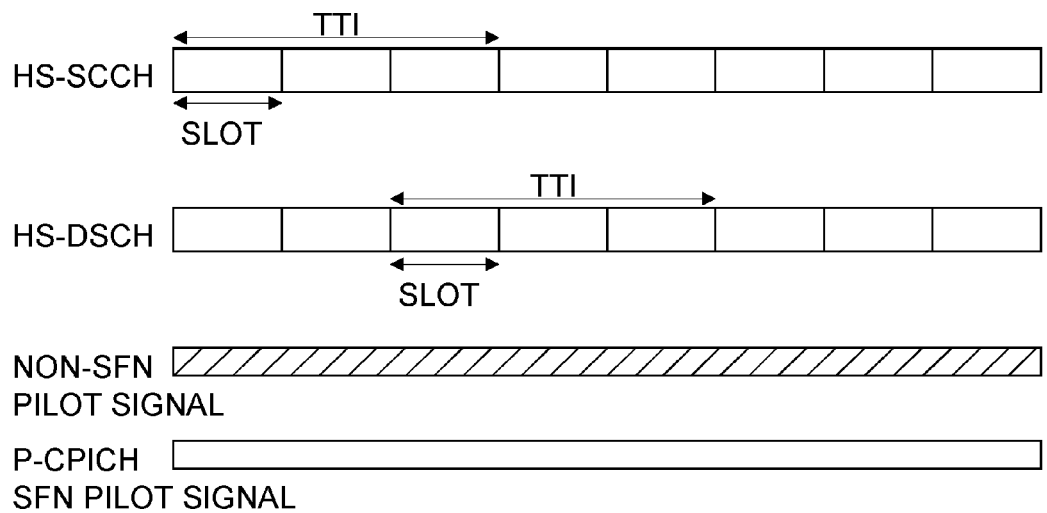
FIG. 9 illustrates code-division multiplexed non-SFN pilot signal for detecting HS-SCCH, HS-DSCH.
Figure 10:
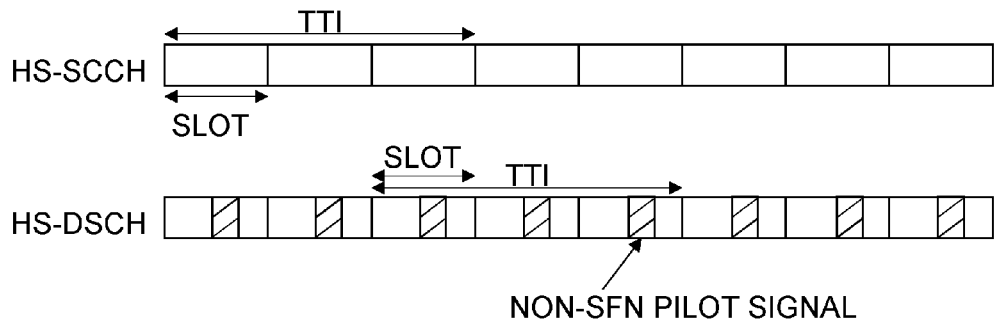
FIG. 10 illustrates time-division multiplexed non-SFN pilot signal for detecting HS-SCCH, HS-DSCH.

The non-SFN pilot can be code-division multiplexed (illustrated in FIG. 9) or time division multiplexed (illustrated in FIG. 10) with the HS-SCCH and HS-DSCH. Note that each RRU still may still transmit the P-CPICH as it is needed by the legacy UEs to use as a channel reference.

In one embodiment, a UE or wireless terminal may be structured such that when it is configured to receive a non-SFN HS-DSCH, i.e. a data channel signal, the UE can also use the non-SFN pilot signal or non-SFN reference to detect the HS-SCCH or control channel. A RRU or LPN may transmit a SFN HS-DSCH in one TTI and transmit a non-SFN HS-DSCH in another TTI as illustrated in FIG. 11.

Figure 11:
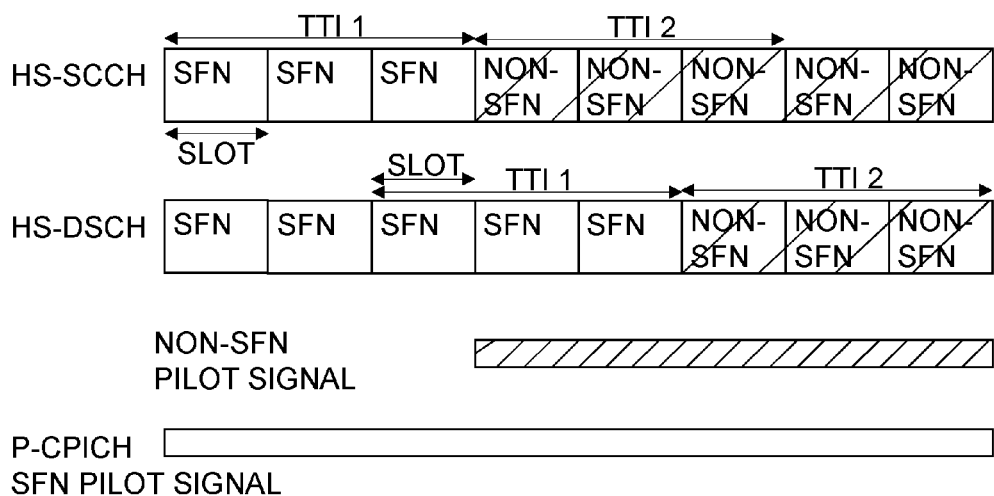
FIG. 11 illustrates an example where a RRU transmits a SFN HS-DSCH in one TTI and transmits a non-SFN HS-DSCH in another TTI.

As seen in FIG. 11, in TTI 1, SFN is used for HS-SCCH and HS-DSCH, whereas in TTI 2, non-SFN is used for HS-SCCH and HS-DSCH. The non-SFN signal may be transmitted by the RRU nearest to the scheduled UE. According to the example in FIG. 11, the non-SFN reference signal is not needed during some time slots since there is no non-SFN HS-SCCH or HS-DSCH. In these time slots, the RRU may turn off the non-SFN reference signal.

As a way of explanation, assume that a UE of interest, which is configured to receive non-SFN HS-DSCH, is scheduled in TTI 2. Also assume that another UE, e.g. a legacy UE, which is configured to receive SFN HS-DSCH, is scheduled in TTI 1. The UE of interest can monitor the HS-SCCH using the non-SFN pilot as the reference signal for channel estimation. During TTI 1, the HS-SCCH monitoring will not result in any meaningful result, i.e. the CRC of HS-SCCH does not check. This is simply due to the CRC of HS-SCCH is masked or scrambled with the ID of the scheduled UE, and thus a non-scheduled UE will fail the CRC check. As a result, only the scheduled UE will go on to receive the associated HS-DSCH subframe.

During TTI 2 however, the UE of interest will see its HS-SCCH decoding pass the CRC check because its UE ID matches the ID used to scramble the HS-SCCH CRC. The UE of interest then can go on to receive the associated HS-DSCH, also using the non-SFN pilot as the channel reference.

A UE may be configured to monitor both SFN and non-SFN HS-SCCH's as the network may use either SFN or non-SFN to transmit the UE data. Following the previous example of FIG. 11, the UE of interest will see its HS-SCCH decoding fail the CRC check during TTI 1, again due to a UE ID mismatch since another UE is scheduled during TTI 1.

In TTI 2, the UE of interest can first use the SFN-pilot, e.g., P-CPICH to attempt to decode HS-SCCH. Such decoding may fail even though the UE ID matches the one used to scramble the CRC of HS-SCCH in TTI 2. This can be due to the mismatch between the SFN channel observed from P-CPICH and the HS-SCCH transmitted only from one RRU. The UE of interest then can use the non-SFN pilot as the reference channel to detect the HS-SCCH again. This time the CRC check of HS-SCCH passes. The UE of interest then can go on to receive the associated HS-DSCH also using the non-SFN pilot as the reference signal. Note that the UE may simultaneously monitor both the SFN and non-SFN pilots.

Figure 12:
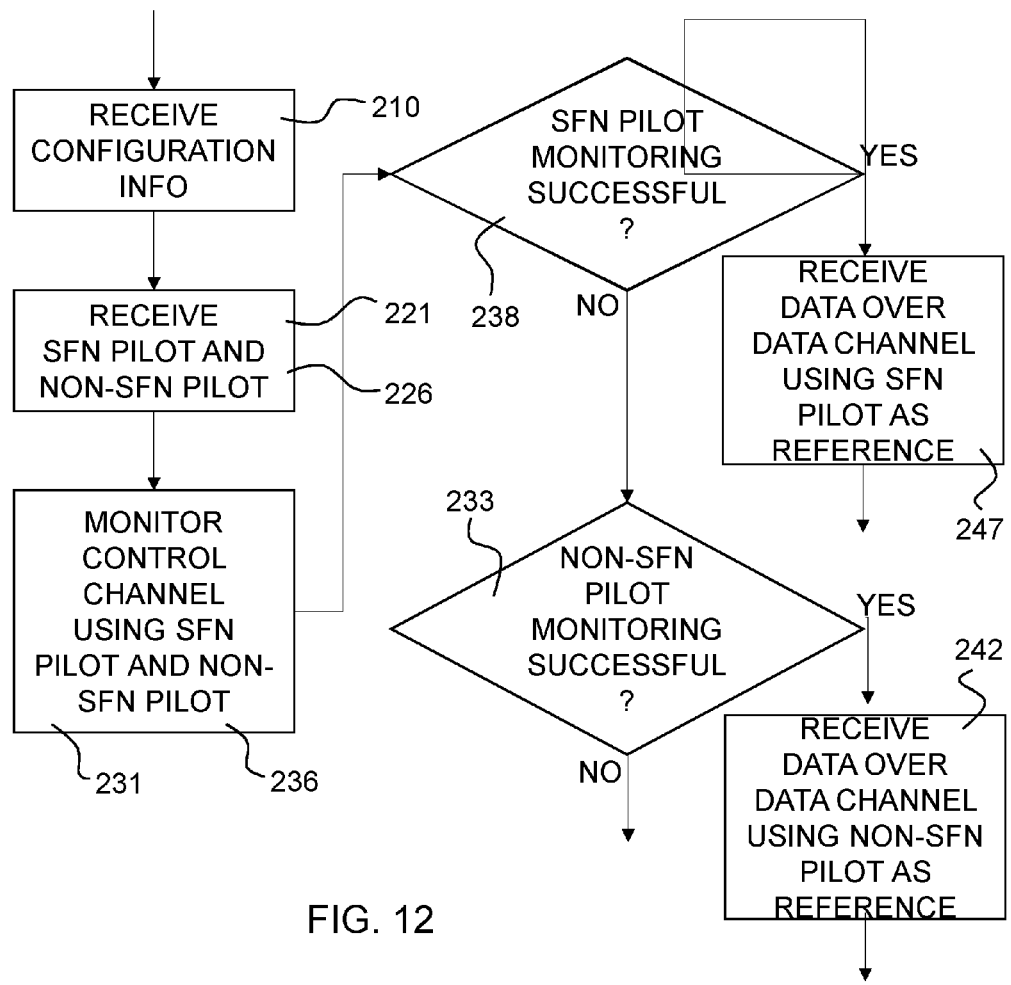
FIG. 12 illustrates an example flow chart of a method performed by a wireless terminal capable of monitoring SFN and non-SFN channels.

FIG. 12 illustrates a flow chart of another example method that may be performed by a wireless terminal capable of monitoring both SFN and non-SFN channels and signals. Again, it may be assumed that the wireless terminal is being served by an LPN of a combined cell, capable of transmitting SFN and non-SFN signals.

In step 210, configuration information is received concerning non-SFN pilot signals in a cell to which the wireless equipment is connected. In steps 221 and 226, a non-SFN pilot signal and a SFN pilot signal, respectively, are received. In steps 231 and 236, a received control channel signal is monitored for scheduled data using the received non-SFN pilot signal and the received SFN pilot signal, respectively, as reference. In step 238, it is determined whether or not the data is scheduled for the wireless terminal using a SFN signal. In other word, it is determined whether or not the SFN pilot monitoring was successful. If the data is scheduled for the wireless terminal using a SFN signal, the process continues to step 246 in which data is received over a data channel using the SFN pilot as a reference. If the data is not scheduled for the wireless terminal using a SFN signal, the process continues to step 233, in which it is determined whether or not the data is scheduled for the wireless terminal using a non-SFN signal. In other word, it is determined whether or not the non-SFN pilot monitoring was successful. If the data is scheduled for the wireless terminal using a non-SFN signal, the process continues to step 245 in which data is received over a data channel using the non-SFN pilot as a reference.

As seen in FIG. 12, the terminal may receive both SFN and non-SFN pilot signals. The terminal may monitor the control channel using both the SFN and non-SFN pilots as reference signal. If the SFN pilot monitoring is successful, e.g. the terminal is able to successfully decode the control channel, then the terminal may receive the data from the LPN over the data channel using the SFN pilot signal for reference. Note that successful monitoring, i.e., successful decoding of the control channel means that data is scheduled for the terminal. The example illustrated in FIG. 12 is based on the terminal first using the SFN pilot monitoring. Alternatively, the terminal may start with first using the non-SFN pilot monitoring.

On the other hand, if the non-SFN pilot monitoring of the control channel is successful, then the terminal may go on to receive the data over the data channel using the non-SFN pilot signal as reference.

Figure 13:
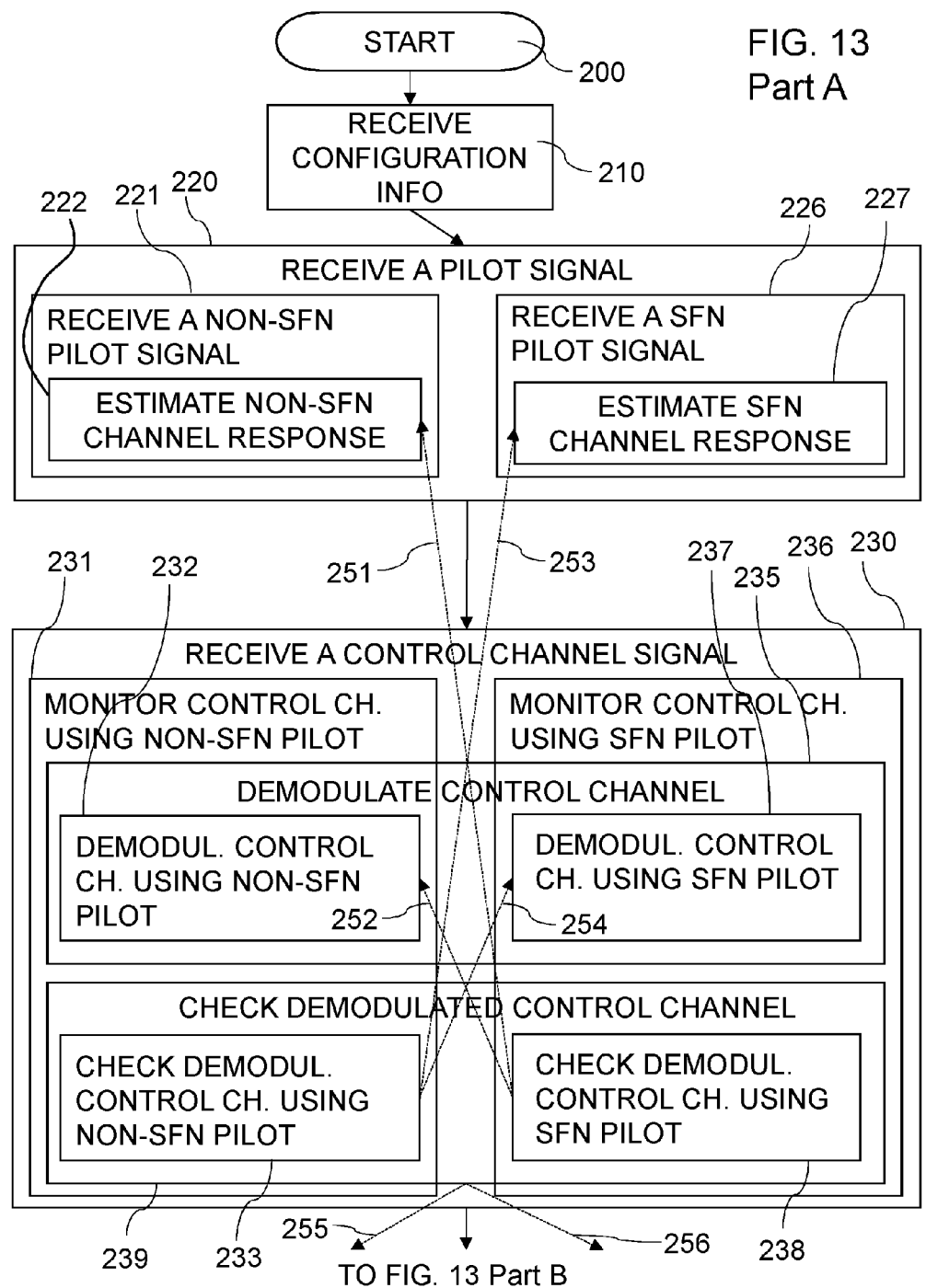
FIG. 13 illustrates a composite flow diagram of a method for receiving data in a wireless equipment in a heterogeneous network cellular communication system.

FIG. 13 is a common illustration of a number of embodiments of a method for receiving data in a wireless equipment in a heterogeneous network cellular communication system. The process starts in step 200 and ends in step 299. In step 210 configuration information about non-SFN pilot signals in a cell to which the wireless equipment is connected is received. Step 220 comprises receiving of a pilot signal. In different embodiments, step 220 comprises at least one of part steps 221 and 226. In step 221 a non-SFN pilot signal is received. In a particular embodiment, step 221 comprises the step 222, in which a channel response associated with the received non-SFN pilot signal is estimated. In step 226 a SFN pilot signal is received. In a particular embodiment, step 226 comprises the step 227, in which a channel response associated with the received SFN pilot signal is estimated. In step 230, a control channel signal is received. In different embodiments, step 230 may comprise a part step 235, where the control channel signal is demodulated. In different embodiments, step 230 may further comprise a part step 239, where the demodulated control channel signal is checked. In different embodiments, step 230 comprises at least one of part steps 231 and 236. In step 231, the received control channel signal is monitored using a received non-SFN pilot signal as reference. Step 231 may comprise a part step 232 of step 235, which step 232 comprises demodulation of the control channel using the channel response associated with the detected non-SFN pilot signal. Step 231 may further comprise a part step 233 of step 239, which step 233 comprises checking if the demodulated control channel is correctly demodulated using the channel response associated with the detected non-SFN pilot signal. In step 236, the received control channel signal is monitored using a received SFN pilot signal as reference. Step 236 may comprise a part step 237 of step 235, which step 237 comprises demodulation of the control channel using the channel response associated with the detected SFN pilot signal. Step 236 may further comprise a part step 238 of step 239, which step 238 comprises checking if the demodulated control channel is correctly demodulated using the channel response associated with the detected SFN pilot signal. In step 240, a data channel signal associated with the received control channel signal is received. Step 240 may comprise a part step 245, in which the data channel signal is demodulated. In different embodiments, the step 245 may comprise the step 241 of demodulating the data channel signal using the channel response associated with the received non-SFN pilot signal. In different embodiments, the step 245 may comprise the step 246 of demodulating the data channel signal using the channel response associated with the received SFN pilot signal.

In one basic embodiment, a method for receiving data in a wireless equipment in a heterogeneous network cellular communication system comprises the step 210 of receiving configuration information about non-SFN pilot signals in a cell to which the wireless equipment is connected. A non-SFN pilot signal is received in step 221. A control channel signal is received in step 230, and in step 231 the received control channel signal is monitoring using the received non-SFN pilot signal as reference. The step 235 comprises demodulation of the control channel signal. In step 240, a data channel signal associated with the received control channel signal is received. In step 245, the data channel signal is demodulated.

In a particular embodiment, the step 221 of receiving a non-SFN pilot signal comprises the step 222 of estimating a channel response associated with the received non-SFN pilot signal and the step 231 of monitoring the received control channel signal comprises the step 232 of demodulating the control channel signal using the channel response associated with the detected non-SFN pilot signal. The step of monitoring 231 comprises the step 233 of checking if the demodulated control channel is correctly demodulated.

In one embodiment, the method comprises, besides the basic steps, also the step 226 of receiving a SFN pilot signal including the step 227 of estimating a channel response associated with the detected SFN pilot signal. The method then also comprises step 236, in which the control channel signal is demodulated using the channel response associated with the received SFN pilot signal. This opens up for switching between use of a non-SFN and a SFN use. This can be performed in different ways, which are indicated by dotted arrows in FIG. 13.

In one particular embodiment, the step 222 of estimating a channel response associated with the received non-SFN pilot signal and the step 232 of demodulating the control channel signal using the channel response associated with the received non-SFN pilot signal are performed when the step 237 of demodulating the control channel signal using the channel response associated with the received SFN pilot signal gives a non-useful result, as checked in step 238. This dependence is illustrated by the dotted arrows 251 and 252. In such a case, the method also comprises the step 242 of demodulating the data channel signal using the channel response associated with the received non-SFN pilot signal.

In another particular embodiment, the step 226 of receiving a SFN pilot signal, the step 227 of estimating a channel response associated with the received SFN pilot signal and the step 237 of demodulating the control channel signal using the channel response associated with the received SFN pilot signal are performed when the step 232 of demodulating the control channel signal using the channel response associated with the detected non-SFN pilot signal gives a non-useful result, as checked in step 233. This dependence is illustrated by the dotted arrows 253 and 254. In such a case, the method also comprises the step 247 of demodulating the data channel signal using the channel response associated with the received SFN pilot signal.

In yet another particular embodiment, the step 239, where the demodulated control channel signal is checked comprises determining of which one of the step 232 of demodulating the control channel signal using the channel response associated with the received non-SFN pilot signal and the step 237 of demodulating the control channel signal using the channel response associated with the received SFN pilot signal that gives the best result. The step 245 of demodulating the data channel signal is then performed using the channel response associated with the best result, as illustrated by the dotted arrows 255 and 256. In one embodiment, the UE may be required to verify which of the demodulation reference signals, i.e., pilot signals, gives the "best" demodulated HS-SCCH. The best demodulation reference signal may be the one which results in a pass in the CRC check. If there are multiple reference signals that pass the CRC check, the best demodulation reference signal may be the one that results in the highest average soft value magnitude or magnitude squared. The soft value may be from the demodulator or from the decoder. Alternatively, the best demodulation reference signal may be the one that results in the best decoding metric. The decoding metric may be the metric associated with the final surviving path according to the Viterbi algorithm employed by the HS-SCCH decoder.

The scope of the disclosed subject fully contemplates possibility of creating any combination of which HS-SCCH channelization code, e.g. OVSF codes, to use and which possible reference signals, pilots, that can be used to demodulate the HS-SCCH code.

For each HS-SCCH physical channel, a number of different reference signals, SFN- or non-SFN pilots, can be associated. In an embodiment, the network may inform a particular UE through signaling which set of reference signals that can be monitored to detect the HS-SCCH.

The signaling from network can be done over the physical layer, e.g., using HS-SCCH orders, or through the use of higher layer signaling such as the RRC layer. Note that in Release 11, there exists a signaling mechanism to convey the configuration of the so-called scheduled or demodulation pilots, D-CPICH, including information about the channel codes and the pilot offsets, using one or more RRC messages at call setup. In one embodiment, such a signaling mechanism may be extended to support the signaling of the configuration of the reference signals for HS-SCCH/HS-DSCH in a combined cell.

Note that it is possible to notify that a UE should monitor several different HS-SCCH codes. Such notification can be provided in a configuration message from the network to the UE. The UE may then try one or several demodulation reference signals for each HS-SCCH code it monitors.

FIG. 14 illustrates a flow chart of an example method that may be performed by an LPN of a combined cell. In this figure, it may be assumed that the LPN performing the method has within its cell portion one or more wireless terminals capable of monitoring multiple reference signals including one or more SFN pilots and one or more non-SFN pilots. In step 260, the LPN transmits configuration information about possible used non-SFN pilot signals in a cell of the LPN. In step 270, a control channel signal is transmitted on a control channel. In other words, the LPN, e.g. an RRU, may transmit resource scheduling information of a data channel to be used to the wireless terminal on a control channel, e.g. HS-SCCH, coded using a channelization code, e.g. OVSF. The channelization code may be the same channelization code used by at least one other node, e.g., another LPN or even the macro node, of the combined cell. At the appointed scheduled time, the LPN may transmit the data to the wireless terminal over the scheduled data channel.

Alternatively, the macro node or any other network node of the cell in the heterogeneous network cellular communication system may transmit the configuration information about possible used non-SFN pilot signals in a combined cell. Step 260 is thus in such an embodiment not performed by the LPN itself. In other words, a method for transmitting data in a heterogeneous network cellular communication system comprises transmitting, from a first network node, configuration information about non-SFN pilot signals in a cell of said first network node, and performing, in a second network node, the remaining steps 262, 264, 270 and 280 presented above. The second network node being different from the first network node.

In step 280, a data channel signal associated with the received control channel signal is transmitted on a data channel. In step 261, it is decided whether or not the data is scheduled for a non-SFN terminal. If the data is scheduled to be sent by a non-SFN signal, the process continues to the combined step 262+264, where both a SFN pilot signal and a non-SFN pilot signal are transmitted. If the data is not scheduled to be sent by a non-SFN signal, the process continues to step 262 in which a SFN pilot signal is transmitted. In other words, if data is scheduled for the wireless terminal which is configured to receive non-SFN data channel, then at the appropriate time, the LPN may transmit non-SFN pilot signal or signals. Note that the SFN pilot signal(s) may also be transmitted. If the data is destined for a SFN terminal, e.g., legacy terminal, then the LPN need only to transmit the SFN pilot signal.

Figure 15:
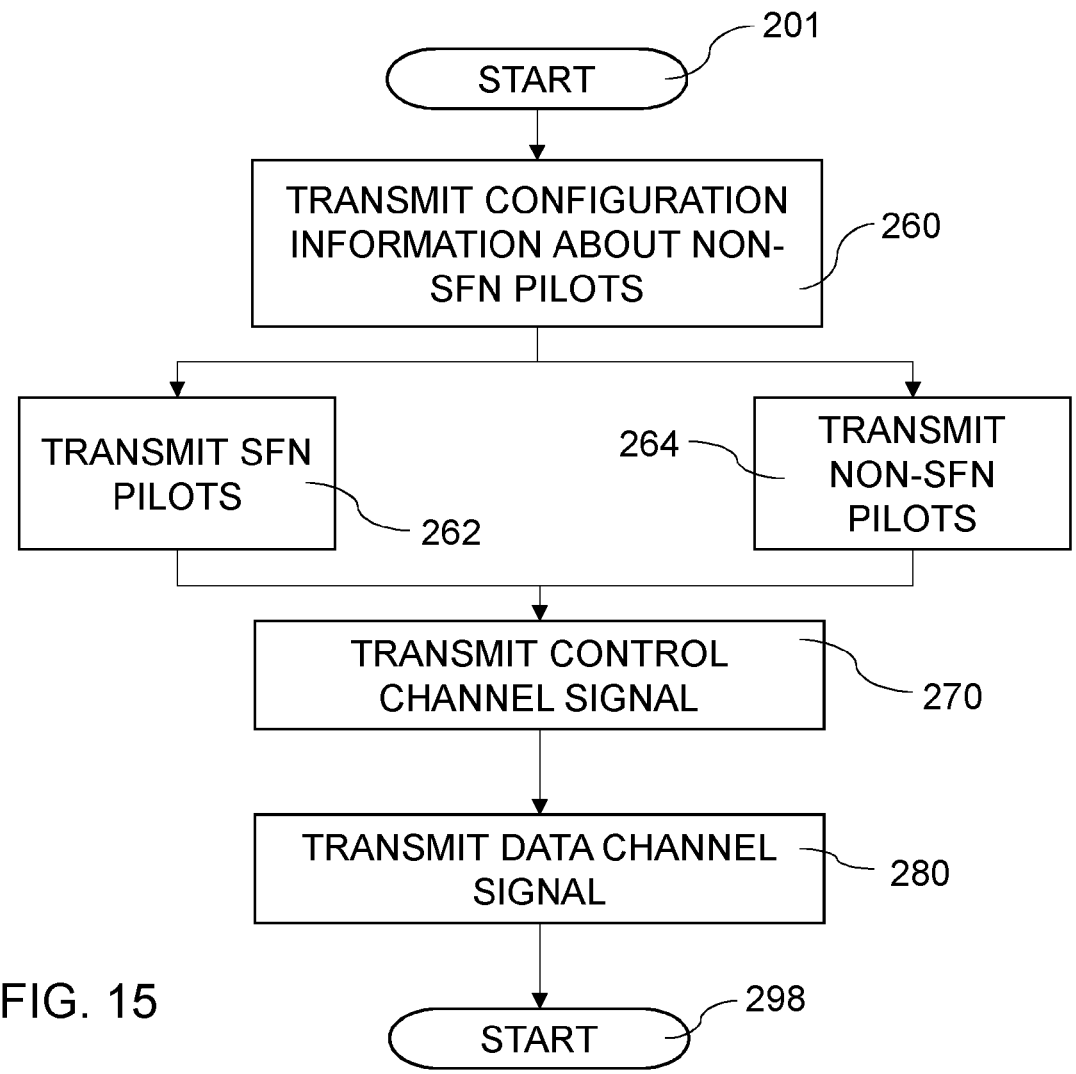
FIG. 15 illustrates a flow diagram of a method for transmitting data in a heterogeneous network cellular communication system.

The flow of FIG. 14 does primarily concern the content of the transmission and not the time aspect. A similar flow diagram, being more time-influenced, is illustrated in FIG. 15. An embodiment of a method, in a network node, for transmitting data in a heterogeneous network cellular communication system starts in step 201 and ends in step 298. In step 260, configuration information about non-SFN pilot signals in a cell of the network node is transmitted. In step 262, a SFN pilot signal is transmitted. In step 264, a non-SFN pilot signal is transmitted. In step 270, a control channel signal is transmitted on a control channel. In step 280, a data channel signal associated with the received control channel signal is transmitted on a data channel.

In a particular embodiment, the method further comprises receiving of a resource schedule from a central scheduler of the heterogeneous network cell. Thereby, the step 264 of transmitting the non-SFN pilot signal can be decided to be performed only when the resource schedule indicates that the network node is scheduled to transmit, in a next transmission time interval, a data signal that is not transmitted by all radio units in the heterogeneous network cell.

Optionally, the LPN may also configure any wireless terminal within its cell portion to listen for the non-SFN channels and pilot signals, for example, during a call set up. Example contents of such configuration message are described above, and thus will not be repeated.

Note that some or all of the steps may be performed by a central controller connected to one or more LPNs. That is, a particular LPN may be a simple radio head which acts to transmit what the central controller instructs it to transmit. In addition, even if an LPN is capable of performing one or more of the steps, nonetheless, that LPN may still receive and carry out instructions from the central controller.

Figure 16:
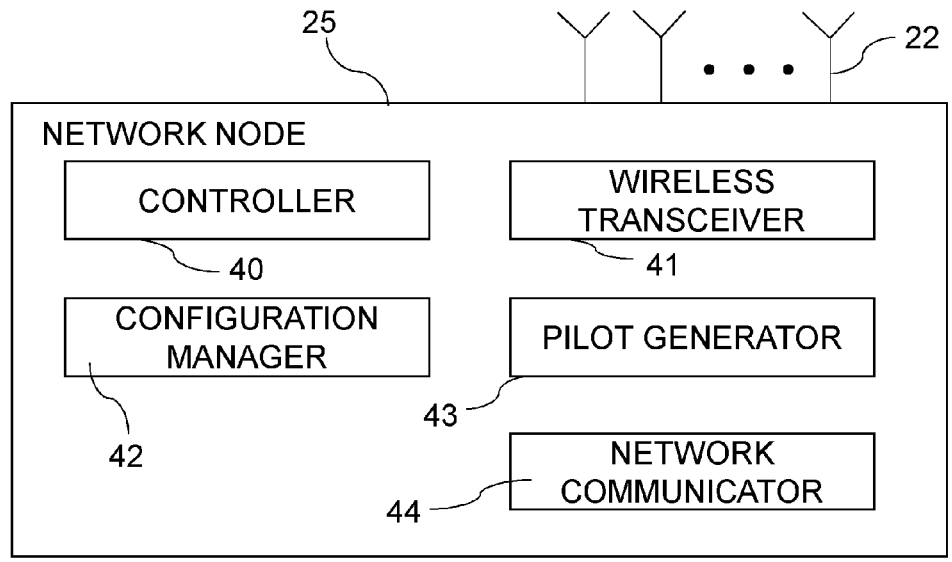
FIG. 16 illustrates an embodiment of a network node.

FIG. 16 illustrates an embodiment of a network node 25 capable of performing the method illustrated in FIGS. 14 and 15. The network node 25 may be a LPN, e.g. a RRU, or a macro Base Station. The example network node 25 may include a controller 40, a network communicator 44, a configuration manager 42, a pilot generator 43, and a wireless transceiver 41. The wireless transceiver 41 may be structured to perform radio communications with wireless terminals via one or more antennas 22. The network communicator 44 may be structured to perform wired and/or wireless communication with other network nodes. The configuration manager 42 may be structured to configure wireless terminals. The pilot generator 43 may be structured to generate SFN and non-SFN pilot signals, which may be transmitted via the transceiver 41. The controller 40 may be structured to control the overall operation of the network node 25.

In an embodiment of a heterogeneous network cellular communication system, a first network node and a second network node are present in a cell. The second network node is different from the first network node. The first network node comprises a configuration manager 42 and a wireless configuration transceiver, which configuration manager 42 is operative to create configuration information about non-SFN pilot signals in said cell. The wireless configuration transceiver is operative to transmit the configuration information. The second network node is a network node according to the embodiment here above, except for the configuration manager 42.

FIG. 16 provides a logical view of the network node 25 and the components included therein. It is not strictly necessary that each component be implemented as physically separate modules. Some or all components may be combined in a physical module.

In one embodiment, a network node in a heterogeneous network cell comprises a pilot generator, a wireless transceiver and a configuration manager. The configuration manager is operative to create configuration information about non-SFN pilot signals in a cell of the network node. The pilot generator is operative to create a SFN pilot signal. The pilot generator is also operative to create a non-SFN pilot signal. The wireless transceiver is operative to transmit the SFN pilot signal. The wireless transceiver is also operative to transmit the non-SFN pilot signal. The wireless transceiver is further operative to transmit a control channel signal on a control channel and is operative to transmit a data channel signal associated with the transmitted control channel signal on a data channel.

In a further embodiment, the network node also comprises a network communicator and a controller. The network communicator is operative to receiving a resource schedule from a central scheduler of the heterogeneous network cell. The controller is operative to determine if the resource schedule indicates that the network node is scheduled to transmit, in a next transmission time interval, a data signal that is not transmitted by all radio units in the heterogeneous network cell. The controller is further operative to instruct the pilot generator to create the non-SFN pilot signal when the resource schedule indicates that the network node is scheduled to transmit, in a next transmission time interval, a data signal that is not transmitted by all radio units in the heterogeneous network cell. The controller is further operative to instruct the wireless transceiver to transmit the non-SFN pilot signal when the resource schedule indicates that the network node is scheduled to transmit, in a next transmission time interval, a data signal that is not transmitted by all radio units in the heterogeneous network cell.

Figure 17:
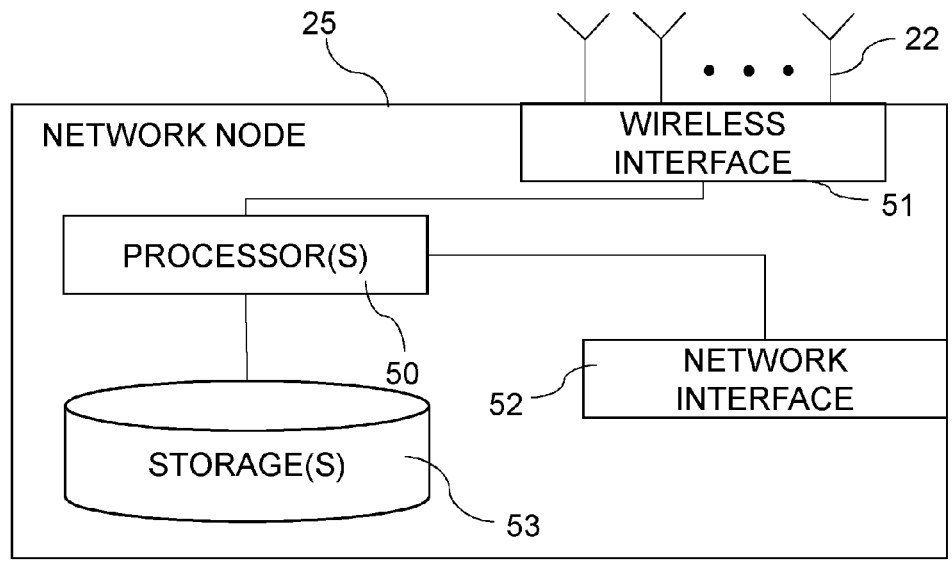
FIG. 17 illustrates an embodiment of a network node.

Also, the components of the network node need not be implemented strictly in hardware. It is envisioned that the components can be implemented through any combination of hardware and software. For example, as illustrated in FIG. 17, the network node 25 may include one or more hardware processors 50, one or more storages 53 (internal, external, both), and one or both of a wireless interface 51 (in case of a radio node) and a network interface 52.

The processor(s) 50 may be structured to execute program instructions to perform the functions of one or more of the network node components. The instructions may be stored in a non-transitory storage medium or in firmware (e.g., ROM, RAM, Flash) denoted as storage(s) 53. Note that the program instructions may also be received through wired and/or or wireless transitory medium via one or both of the wireless and network interfaces. The wireless interface 51 (e.g., a transceiver) may be structured to receive signals from and send signals to wireless terminals via one or more antennas 22. The network interface 52 may be included and structured to communicate with other network nodes.

In one embodiment, a network node in a heterogeneous network cell comprises a wireless interface, a network interface, a processor and a storage comprising instructions executable by the processor. The network node is operative to transmit configuration information about non-SFN pilot signals in a cell of the network node. The network node is also operative to transmit a SFN pilot signal and to transmit a non-SFN pilot signal. The network node is further operative to transmit a control channel signal on a control channel; and to transmit a data channel signal associated with the transmitted control channel signal on a data channel.

In one embodiment, a network node in a heterogeneous network cell comprises five transmitting modules. A first transmitting module is for transmitting a SFN pilot signal. A second transmitting module is for transmitting a control channel signal on a control channel. A third transmitting module is for transmitting a data channel signal associated with said received control channel signal on a data channel. A fourth transmitting module is for transmitting configuration information about non-SFN pilot signals in a cell of said network node. A fifth transmitting module is for transmitting said non-SFN pilot signal.

An embodiment of a computer program resides in a storage. The computer program comprises program code, which when executed by a processing circuitry causes the processing circuitry to transmit configuration information about non-SFN pilot signals in a cell of the network node. The processing circuitry is further caused to transmit a SFN pilot signal and to transmit a non-SFN pilot signal. The processing circuitry is further caused to transmit a control channel signal on a control channel and to transmit a data channel signal associated with the transmitted control channel signal on a data channel.

An embodiment of a computer program product comprises a computer-readable medium on which a computer program is stored. The computer program comprises program code, which when executed by a processing circuitry causes the processing circuitry to transmit configuration information about non-SFN pilot signals in a cell of the network node. The processing circuitry is further caused to transmit a SFN pilot signal and to transmit a non-SFN pilot signal. The processing circuitry is further caused to transmit a control channel signal on a control channel and to transmit a data channel signal associated with the transmitted control channel signal on a data channel.

Figure 18:
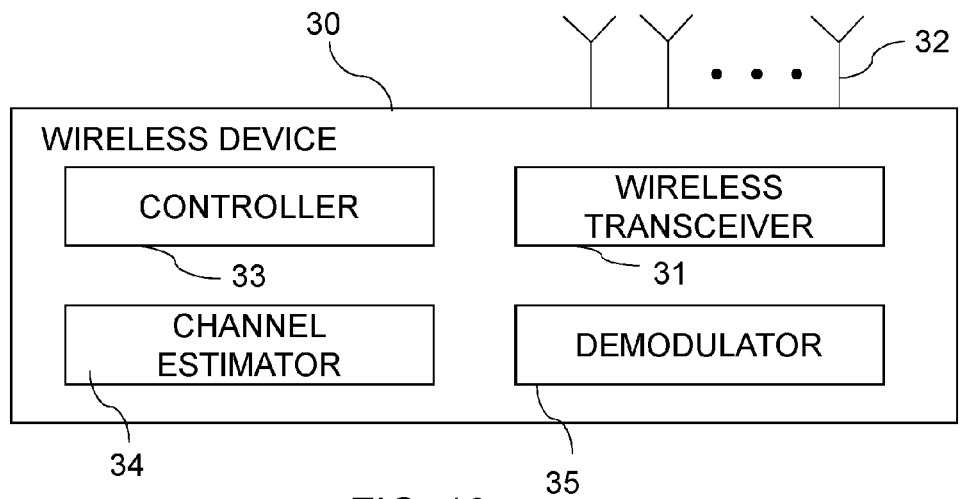
FIG. 18 illustrates an embodiment of a wireless terminal.

FIG. 18 illustrates an embodiment of a wireless terminal 30 or wireless device capable of performing the method illustrated in FIG. 7, FIG. 12 and/or FIG. 13. The example wireless terminal 30 may include a controller 33, a wireless transceiver 31, a channel estimator 34, and a demodulator 35. The wireless transceiver 31 may be structured to perform radio communications with other radio nodes such as macro and LPNs via one or more antennas 32. The channel estimator 34 may be structured to estimate channels such as control and data channels based on any number of pilot signals including both SFN and non-SFN pilots. The demodulator 35 may be structured to demodulate also based on both SFN and non-SFN pilots. The controller 33 may be structured to control the overall operation of the network node 30.

FIG. 18 provides a logical view of the wireless terminal 30 and the components included therein. It is not strictly necessary that each component be implemented as physically separate modules. Some or all components may be combined in a physical module.

In one embodiment, a wireless device comprises a wireless transceiver, a channel estimator, a controller and a demodulator. The wireless transceiver is operative to receive configuration information about non-SFN pilot signals in a cell to which the wireless device is connected. The wireless transceiver is also operative to receive such a non-SFN pilot signal. The wireless transceiver is further operative to receive a control channel signal and to receive a data channel signal associated with the received control channel signal. The controller is operative to monitor the received control channel signal using the received non-SFN pilot signal as reference. The demodulator is operative to demodulate the control channel signal and to demodulate the data channel signal.

In a further embodiment, the channel estimator is operative to estimate a channel response associated with the received non-SFN pilot signal. The demodulator is operative to demodulate the control channel signal using the channel response associated with the detected non-SFN pilot signal. Thereby, the controller is operative to check if the demodulated control channel is correctly demodulated.

In a further embodiment, the wireless transceiver is operative to receive also a SFN pilot signal. The channel estimator is operative to estimate a channel response associated with the detected SFN pilot signal. The demodulator is operative to demodulate the control channel signal using the channel response associated with the received SFN pilot signal.

Figure 19:
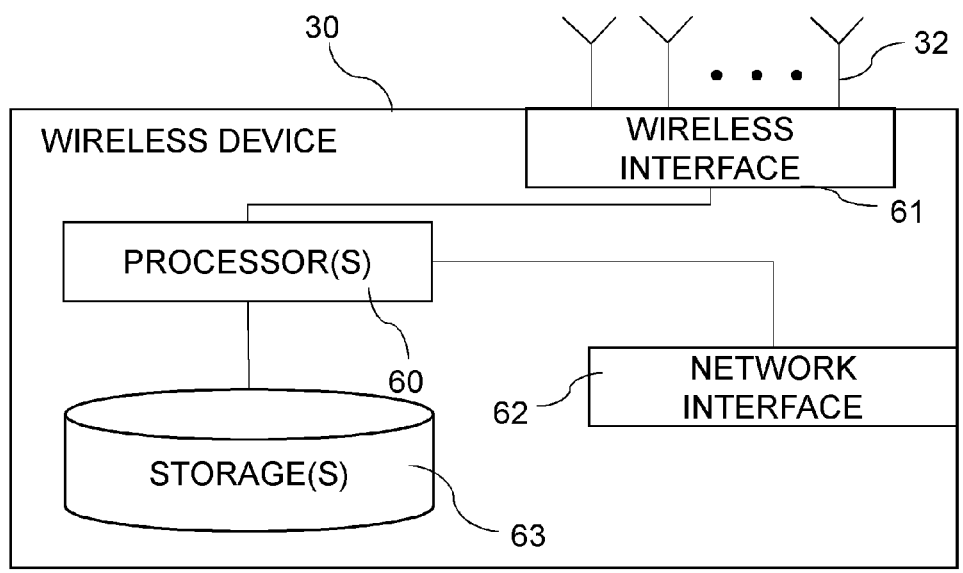
FIG. 19 illustrates an embodiment of a wireless terminal.

Also, the components of the wireless terminal need not be implemented strictly in hardware. It is envisioned that the components can be implemented through any combination of hardware and software. For example, as illustrated in FIG. 19, the wireless terminal 30 may include one or more hardware processors 60, one or more storages 63 (internal, external, both), and one or both of a wireless interface 61 and a network interface 62 (e.g., USB port).

The processor(s) 60 may be structured to execute program instructions to perform the functions of one or more of the wireless terminal components. The instructions may be stored in a non-transitory storage medium or in firmware (e.g., ROM, RAM, Flash) denoted as storage(s) 63. Note that the program instructions may also be received through wired and/or wireless transitory medium via the wireless and network interfaces. The wireless interface 61 (e.g., a transceiver) may be structured to receive signals from and send signals to wireless terminals via one or more antennas 32. The network interface 62 may be included and structured to communicate with other network nodes.

In one embodiment, a wireless device comprises a wireless interface, a processor and a storage comprising instructions executable by the processor. The wireless device is operative to receive configuration information about non-SFN pilot signals in a cell to which the wireless equipment is connected. The wireless device is also operative to receive such a non-SFN pilot signal. The wireless device is further operative to receive a control channel signal and to demodulate the control channel signal. The wireless device is further operative to monitor the received control channel signal using the received non-SFN pilot signal as reference. The wireless device is further operative to receive a data channel signal associated with the received control channel signal and to demodulate the data channel signal.

In one embodiment, a wireless device comprises a first receiving module for receiving a control channel signal and a first demodulating module for demodulating the control channel signal. The wireless device further comprises a second receiving module for receiving a data channel signal associated with the received control channel signal and a second demodulating module for demodulating the data channel signal. The wireless device further comprises a third receiving module for receiving configuration information about non-SFN pilot signals in a cell to which the wireless equipment is connected. The wireless device further comprises a fourth receiving module for receiving a non-SFN pilot signal and a monitoring module for monitoring the received control channel signal using the received non-SFN pilot signal as reference.

An embodiment of computer program resides in a storage. The computer program comprises program code, which when executed by a processing circuitry causes the processing circuitry to receive configuration information about non-SFN pilot signals in a cell to which a wireless equipment is connected. The processing circuitry is also caused to receive a non-SFN pilot signal, to receive a control channel signal and to demodulate the control channel signal. The processing circuitry is further caused to monitor the received control channel signal using the received non-SFN pilot signal as reference. The processing circuitry is further caused to receive a data channel signal associated with the received control channel signal and to demodulate the data channel signal.

An embodiment of a computer program product comprises a computer-readable medium on which a computer program is stored. The computer program comprises program code, which when executed by a processing circuitry causes the processing circuitry to receive configuration information about non-SFN pilot signals in a cell to which a wireless equipment is connected. The processing circuitry is also caused to receive a non-SFN pilot signal, to receive a control channel signal and to demodulate the control channel signal. The processing circuitry is further caused to monitor the received control channel signal using the received non-SFN pilot signal as reference. The processing circuitry is further caused to receive a data channel signal associated with the received control channel signal and to demodulate the data channel signal.

The subject matter of the present technical teachings provide downlink scheduling signaling, e.g., identity of the scheduled UE, transport format, etc., in a resource efficient manner in a combined cell. Furthermore, reuse of OVSF code in multiple cell portions of a combined cell is provided, thus availing a greater portion of the code tree to data channel. The same pilot signal is shared for control and data channels.

ABBREVIATIONS

BS Base Station
CRC Cycle Redundancy Check
CoMP Coordinated Multiple-Point
E-TFCI Enhanced TFCI
GSM Global System for Mobile communications
HetNet heterogeneous network
HSDPA High Speed Downlink Packet Access
HSPA High Speed Packet Access
HS-DSCH High Speed Downlink Shared Channel
HS-PDSCH High Speed Physical Downlink Shared Channel
HS-SCCH High Speed Shared Control Channel
ID Identity
LPN Low Power Node
MIMO Multiple-Input Multiple-Out-put
OVSF Orthogonal Variable Spreading Factor
P-CPICH Primary Common Pilot Channel
RRU Remote Radio Units
SF Spreading Factor
SFN Single Frequency Network
SRB Signaling Radio Bearer
TFCI Transmit Format Combination Indicator
TTI Transmit Time Interval
UE User Equipment
UMTS Universal Mobile Telecommunications System
WCDMA Wideband Code Division Multiple Access
WiMax Worldwide Interoperability for Microwave Access The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method in a wireless device configured for operation in a heterogeneous network cellular communication system, said method comprising:
receiving a control channel signal and an associated data channel signal that are transmitted by one or more radio units of a heterogeneous network cell in the heterogeneous network cellular communication system, wherein the control and data channel signals are associated with a first pilot signal transmitted from all the radio units, or are associated with a second pilot signal that is transmitted from a subset of the radio units; and
determining whether to demodulate the data channel signal using a first channel response estimated from the first pilot signal as received at the wireless device, or using a second channel response estimated from the second pilot signal as received at the wireless device, in dependence on demodulation results obtained by attempting to demodulate the control channel signal with one or both of the first and second channel response estimates.

2. The method according to claim 1, wherein determining whether to demodulate the data channel signal using the first or second channel response estimate comprises demodulating the data channel signal using the first channel response estimate in response to determining that the control channel signal is correctly demodulated using the first channel response estimate, or demodulating the data channel signal using the second channel response estimate in response to determining that the control channel signal is correctly demodulated using the second channel response estimate.

3. The method according to claim 1, wherein, in said step of determining,
the wireless device initially attempts to demodulate the control channel signal using the first channel response estimate and, if such initial attempt is successful, the wireless device demodulates the data channel signal using the first channel response estimate and does not attempt to demodulate the control and data channel signals using the second channel response estimate, or
the wireless device initially attempts to demodulate the control channel signal using the second channel response estimate and, if such initial attempt is successful, the wireless device demodulates the data channel signal using the second channel response estimate and does not attempt to demodulate the control and data channel signals using the first channel response estimate.

4. The method according to claim 1, wherein determining whether to demodulate the data channel signal using the first or second channel response estimate comprises obtaining first demodulation results by demodulating the control channel signal using the first channel response estimate, obtaining second demodulation results by demodulating the control channel signal using the second channel response estimate, and demodulating the data channel signal using the first channel response estimate if the first demodulation results are better than the second demodulation results, or demodulating the data channel signal using the second channel response estimate if the second demodulation results are better than the first demodulation results.

5. The method according to claim 1, further comprising receiving configuration information regarding the second pilot signal.

6. The method according to claim 1, wherein the second pilot signal is intended specifically for said wireless device.

7. A wireless device configured for operation in a heterogeneous cellular network communication system, comprising:
a wireless transceiver operative to receive signals from a heterogeneous network cell of the heterogeneous network cellular system; and
processing circuitry operatively associated with the wireless transceiver and configured to:
receive, via the wireless transceiver, a control channel signal and an associated data channel signal that are transmitted by one or more radio units of the heterogeneous network cell, where the control and data channel signals are associated with a first pilot signal transmitted from all the radio units, or are associated with a second pilot signal that is transmitted from a subset of the radio units; and
determine whether to demodulate the data channel signal using a first channel response estimated from the first pilot signal as received at the wireless device, or using a second channel response estimated from the second pilot signal as received at the wireless device, in dependence on demodulation results obtained by attempting to demodulate the control channel signal with one or both of the first and second channel response estimates.

8. The wireless device according to claim 7, wherein the processing circuitry is configured to demodulate the data channel signal using the first channel response estimate in response to determining that the control channel signal is correctly demodulated using the first channel response estimate, or to demodulate the data channel signal using the second channel response estimate in response to determining that the control channel signal is correctly demodulated using the second channel response estimate.

9. The wireless device according to claim 7, wherein, to determine whether to demodulate the data channel signal using the first channel response estimate or the second channel response estimate, the processing circuitry is configured to:
initially attempt to demodulate the control channel signal using the first channel response estimate and, if such initial attempt is successful, demodulate the data channel signal using the first channel response estimate and not attempt to demodulate the control and data channel signals using the second channel response estimate, or
initially attempt to demodulate the control channel signal using the second channel response estimate and, if such initial attempt is successful, demodulate the data channel signal using the second channel response estimate and not attempt to demodulate the control and data channel signals using the first channel response estimate.

10. The wireless device according to claim 7, wherein the processing circuitry is configured to determine whether to demodulate the data channel signal using the first or second channel response estimate, based on being configured to obtain first demodulation results by demodulating the control channel signal using the first channel response estimate, obtain second demodulation results by demodulating the control channel signal using the second channel response estimate, and demodulate the data channel signal using the first channel response estimate if the first demodulation results are better than the second demodulation results, or demodulate the data channel signal using the second channel response estimate if the second demodulation results are better than the first demodulation results.

11. A method of operation in a heterogeneous communication network that includes a heterogeneous network cell having multiple radio nodes, including a macro node providing radio coverage over the heterogeneous network cell, and one or more low-power nodes sharing a same cell identifier as the macro node and providing hot-spot radio coverage in respective portions of the heterogeneous network cell, the method comprising:
scheduling Single Frequency Network (SFN) data channel transmissions to one or more first wireless terminals operating in the heterogeneous network cell, based on transmitting associated SFN control channel signals; and
scheduling non-SFN data channel transmissions to one or more second wireless terminals operating in the heterogeneous network cell, based on transmitting associated non-SFN control channel signals;
wherein SFN transmissions are commonly transmitted by all of the multiple radio nodes in the heterogeneous network cell and non-SFN transmissions are transmitted by fewer than all of the multiple radio nodes in the heterogeneous network cell; and
wherein the method includes:
transmitting an SFN pilot signal for use as a demodulation reference for all SFN control and data channel transmissions, and, for any given non-SFN data and associated control channel transmission, transmitting a non-SFN pilot signal from the low-power node or nodes involved in the given non-SFN data and associated control channel transmissions, as a demodulation reference for the given non-SFN data and associated control channel transmission.

12. The method of claim 11, further comprising, for the given non-SFN data and associated control channel transmission, transmitting configuration information indicating a configuration of the non-SFN pilot signal transmitted from the low-power node or nodes involved in the given non-SFN data and associated control channel transmission, for receipt by one or more wireless devices targeted by given non-SFN data and associated control channel transmission.

13. The method of claim 11, wherein transmitting the non-SFN pilot signal comprises transmitting the non-SFN pilot signal from the low-power node or nodes involved in the given non-SFN data and associated control channel transmission, in conjunction with performing a scheduled transmission of the non-SFN data.

14. The method of claim 11, wherein the given non-SFN and associated control channel transmission is one of two or more given non-SFN and associated control channel transmissions involving the same low-power node or nodes, and wherein the method further comprises transmitting the non-SFN pilot signal from the same low-power node or nodes in conjunction with the two or more given non-SFN data and associated control channel transmissions, for common use by the wireless device or devices targeted by two or more given non-SFN data and associated control channel transmissions.

15. The method of claim 11, wherein scheduling the SFN data channel transmissions and the non-SFN data channel transmissions comprises centrally scheduling the SFN and non-SFN data channel transmissions and distributing corresponding scheduling information to the one or more low-power nodes.

16. The method of claim 11, further comprising receiving scheduling information at the low-power node or nodes involved in the given non-SFN data and associated control channel transmission, the scheduling information being received from a centralized scheduler and controlling scheduling of the given non-SFN data and associated control channel transmission.

17. An arrangement configured for operation in a heterogeneous communication network that includes a heterogeneous network cell having multiple radio nodes, including a macro node providing radio coverage over the heterogeneous network cell, and one or more low-power nodes sharing a same cell identifier as the macro node and providing hot-spot radio coverage in respective portions of the heterogeneous network cell, the arrangement comprising:
first processing circuitry in at least one of the multiple radio nodes, the first processing circuitry configured to schedule Single Frequency Network (SFN) data channel transmissions to one or more first wireless terminals operating in the heterogeneous network cell, the scheduled SFN data channel transmissions indicated via the transmission of associated SFN control channel signals, and schedule non-SFN data channel transmissions to one or more second wireless terminals operating in the heterogeneous network cell, the scheduled non-SFN data channel transmissions indicated via the transmission of associated non-SFN control channel signals;
wherein SFN transmissions are commonly transmitted by all of the multiple radio nodes in the heterogeneous network cell and non-SFN transmissions are transmitted by fewer than all of the multiple radio nodes in the heterogeneous network cell; and
wherein the arrangement further includes:
second processing circuitry and associated radio circuitry in each of the multiple radio nodes that are configured to transmit an SFN pilot signal from the node for use as a demodulation reference for all SFN control and data channel transmissions, and, for any given non-SFN data and associated control channel transmission that involves the node, to transmit a non-SFN pilot signal from the node, as a demodulation reference for the given non-SFN data and associated control channel transmission.

18. The arrangement of claim 17, wherein the arrangement is configured to transmit configuration information indicating a configuration of the non-SFN pilot signal transmitted from each low-power node involved in the given non-SFN data and associated control channel transmission, for receipt by one or more wireless devices targeted by given non-SFN data and associated control channel transmission.

19. The arrangement of claim 17, wherein each low-power node involved in the given non-SFN data and associated control channel transmission is configured to transmit the non-SFN pilot signal in conjunction with performing a scheduled transmission of the non-SFN data.

20. The arrangement of claim 17, wherein the first processing circuitry is associated with the macro node and is configured to schedule the SFN data channel transmissions and the non-SFN data channel transmissions and distribute, via an inter-node communication interface of the macro node, corresponding scheduling information to the one or more low-power nodes.

21. The arrangement of claim 17, wherein the second processing circuitry at each low-power node is configured to receive, via an inter-node communication interface of the low-power node, scheduling information from a centralized scheduler, the scheduling information scheduling non-SFN data and associated control channel transmissions from the low-power node, and wherein the second processing circuitry is configured to perform non-SFN data and associated control channel transmissions via the radio circuitry, according to the received scheduling information.

* * * * *